(12) United States Patent  
Whitener et al.

(10) Patent No.: US 7,861,435 B1
(45) Date of Patent: Jan. 4, 2011

(54) METHOD AND SYSTEM FOR ADJUSTING A TURBOMACHINE GLAND SEAL

(75) Inventors: Randy E. Whitener, Oviedo, FL (US); Terrell H. Yon, III, Orlando, FL (US); William G. Morgan, Jr., Sanford, FL (US)

(73) Assignee: Siemens Energy, Inc., Orlando, FL (US)

( * ) Notice: Subject to any disclaimer, the term of this patent is extended or adjusted under 35 U.S.C. 154(b) by 24 days.

(21) Appl. No.: 12/481,736

(22) Filed: Jun. 10, 2009

(51) Int. Cl.
*G01B 5/25* (2006.01)

(52) U.S. Cl. .......................................... 33/645; 33/613
(58) Field of Classification Search ............... 33/645, 33/613, 533
See application file for complete search history.

(56) References Cited

U.S. PATENT DOCUMENTS

| | | | |
|---|---|---|---|
| 2,815,582 A * | 12/1957 | Karstens ........................ | 33/661 |
| 4,579,349 A | 4/1986 | Pipich et al. | |
| 4,700,488 A * | 10/1987 | Curti ............................ | 33/613 |
| 4,792,911 A | 12/1988 | Gonzalez et al. | |
| 4,805,316 A * | 2/1989 | Curti ............................ | 33/613 |
| 4,815,748 A | 3/1989 | Schubert | |
| 5,199,182 A * | 4/1993 | Fowler ......................... | 33/645 |
| 6,236,128 B1 | 5/2001 | Dragash, Jr. | |
| 6,378,873 B1 | 4/2002 | Mayer et al. | |
| 6,431,550 B1 | 8/2002 | Tong | |
| 6,662,725 B1 * | 12/2003 | Koizumi et al. .............. | 101/486 |
| 6,685,190 B1 | 2/2004 | Mayer et al. | |
| 6,707,179 B2 | 3/2004 | Guttromson et al. | |
| 6,856,059 B2 | 2/2005 | Stewart et al. | |
| 7,161,255 B2 | 1/2007 | Arcand | |
| 7,305,774 B1 * | 12/2007 | Whaley ........................ | 33/613 |
| 7,387,301 B2 | 6/2008 | Rupp et al. | |
| 7,406,777 B2 * | 8/2008 | Grover et al. ................. | 33/645 |
| 7,716,846 B2 * | 5/2010 | Sanders ........................ | 33/517 |
| 2009/0320309 A1 * | 12/2009 | Lee .............................. | 33/645 |

* cited by examiner

*Primary Examiner*—Christopher W Fulton

(57) ABSTRACT

A method of determining an alignment of a floating seal for a turbo machine, including establishing a reference surface on a rotor of the turbomachine that is essentially perpendicular to an instantaneous centerline of the rotor, establishing a control surface that radially aligns a floating seal member that surrounds the rotor, providing an inflatable member arranged between a stationary portion of the turbomachine and a surface of the floating seal, inflating the inflatable member such that the inflatable member urges the floating seal firmly against the control surface, measuring an axial distance between the floating seal and the reference surface at a plurality of locations, determining a parallelism between the facing surfaces of the floating seal and the rotor based upon the plurality of measured axial distances, comparing the determined parallelism with a predetermined threshold, and adjusting an orientation of the control surface based upon the comparison.

17 Claims, 5 Drawing Sheets

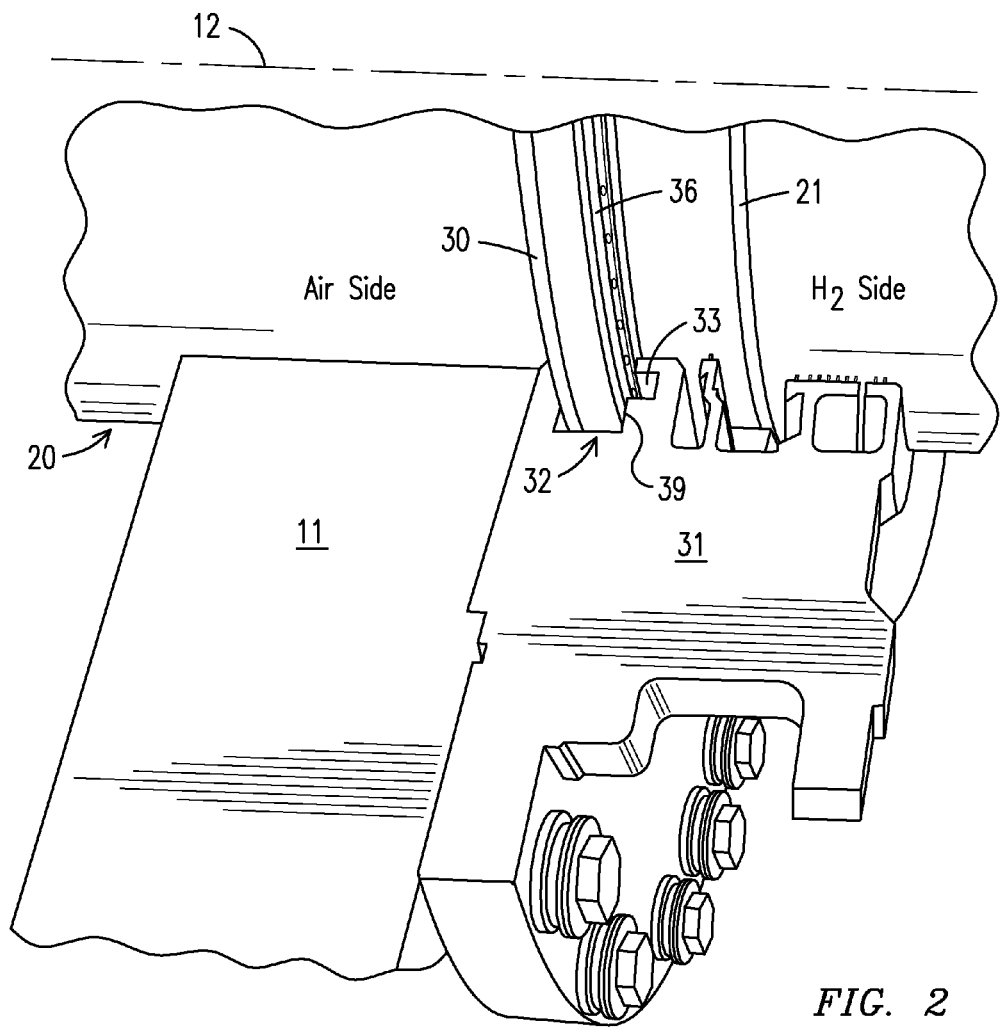
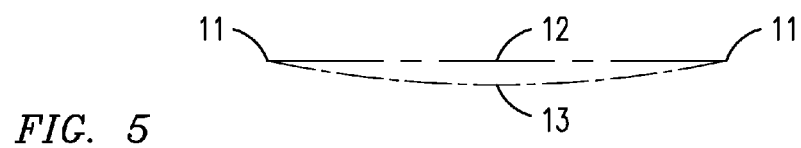
FIG. 2
PRIOR ART
FIG. 5

METHOD AND SYSTEM FOR ADJUSTING A TURBOMACHINE GLAND SEAL

FIELD OF THE INVENTION

The present invention provides a method and system for determining an alignment and adjusting a turbomachine gland seal, and more particularly a method and system for determining an alignment and adjusting a gland seal ring and a rotor of a hydrogen cooled electric generator.

BACKGROUND OF THE INVENTION

Turbomachines include a rotational shaft known as a rotor and a stationary portion known as a stator where a gas tight seal is required between the rotor and the stator. Turbomachines include, but are not limited to steam turbines, gas turbines, electric generators, compressors, and pumps. For example, an electric generator typically includes main components like a rotor and stationary electrical conductors. The rotor typically includes rotor electrical conductors that produce a magnetic field when energized with an electric current. If the energizing current is direct, then the magnetic field produced is constant in magnitude. However, as the rotor rotates, the field strength at a stationary point will vary as the magnetic field poles pass by. The stationary electrical windings surround the rotor and are arranged to intersect the rotating magnetic field such that an alternating current is induced in the stationary electrical windings. The stationary windings are connected to an electrical network such that the induced alternating current is distributed to many users.

Operation of the generator produces heat within the internal components of the generator. Typically, generators are cooled by a cooling medium, such as air, water or hydrogen gas. In the case of hydrogen gas, care must be taken to prevent mixing of the hydrogen gas with the surrounding air to avoid an explosive mixture of hydrogen and oxygen. Typically, hydrogen cooled generators are operated under positive pressure and high hydrogen purity to ensure that a combustible mixture of hydrogen and oxygen does not result within the generator. A hydrogen cooled generator is typically enclosed within a strong shell like frame that can not only support the weight, operational and transient loads of the generator, but also contain the hydrogen gas and prevent it from escaping into the atmosphere where it can form into a combustible mixture.

There are many locations on the generator where internal components of the generator must penetrate or pass through the frame, such as the rotor and the stationary electrical conductors. Because the rotor must be free to rotate, a sufficient clearance must be provided between the generator frame and an outer surface of the rotor. Typically, a gland seal is provided between the rotor and the frame to prevent the rapid escape of hydrogen gas.

A gland seal, also known as a hydrogen seal, is well known and functions by forcing a fluid, typically sealing oil, under a pressure greater than that exerted by the opposing hydrogen pressure through a radial gap provided between the rotor and a sealing surface of the gland seal. The sealing oil effectively seals the gap between the rotor and the gland seal thus preventing the leakage of the hydrogen gas and the resultant dangerous mixture of hydrogen and air.

To effectively seal the generator, the radial gap between the gland seal and the rotor must be as small as practical while leaving sufficient clearance for rotation of the rotor. The diametrical clearance between the gland seal ring and the rotor is proportional to the rotor diameter at the axial location of the gland seal ring and typically is on the order of several thousands of an inch as measured on diameter. Due to the tight radial clearance between the rotor and the gland seal, radial and angular alignment of the gland seal to the rotor is critical. Improper alignment of the gland seal can lead to contact of the rotor with the gland seal causing impermissible wear of the gland seal and/or excessive rotor vibration. Both situations are unacceptable and will likely result in a forced shut down of the generator to remedy the situation.

The rotor is typically supported at its opposite ends by bearings arranged outside of the gland seals, see FIG. 1. Due to the large span between the bearings and the weight of the rotor, the rotor will, sag in its middle causing a difference between a theoretical centerline of the machine and an instantaneous centerline of the rotor, see FIG. 5. The rotor sag forms an angle between the instantaneous rotor centerline and the theoretical centerline of the machine. If the gland seal is aligned to the theoretical machine centerline, the slope of the rotor at the axial location of the gland seal will result in an inconsistent radial gap from an outboard edge of the gland seal to an inboard edge of the gland seal and from a top to a bottom of the gland seal resulting in uneven pressure and flow of the sealing oil circumferentially around the gland seal. Therefore, the gland seal should advantageously be aligned to the instantaneous angle of the rotor and not to the theoretical rotational centerline.

The orientation of the gland seal is determined by the gland seal housing that supports the gland seal. Furthermore, the orientation of the gland seal housing depends upon an orientation of a mating surface between the gland seal housing and a structural bearing support bracket that the gland seal bracket attaches to.

BRIEF DESCRIPTION OF THE DRAWINGS

The invention is explained in the following description in view of the drawings that show:

FIG. 2 is an isometric view of a known gland seal and rotor that employs the present invention;

FIG. 5 shows the relationship between machine centerline and rotor instantaneous centerline;

DETAILED DESCRIPTION OF THE INVENTION

The present invention is disclosed in context of determining an alignment within an electric generator of an electric power production facility. The principles of the present invention, however, are not limited to use with an electric generator or within an electricity power production facility. For example, the methods and/or systems could be used within the aerospace, transportation or manufacturing industries or any other area where alignment of a slidable seal is needed between a stationary and rotating component. One skilled in the art may find additional applications for the methods, systems, apparatus, and configurations disclosed herein.

Thus the illustration and description of the present invention in context of the exemplary electric generator is merely one possible application of the present invention. However the present invention has particular applicability for use as a method for determining an alignment within an electric generator.

Figure 1:
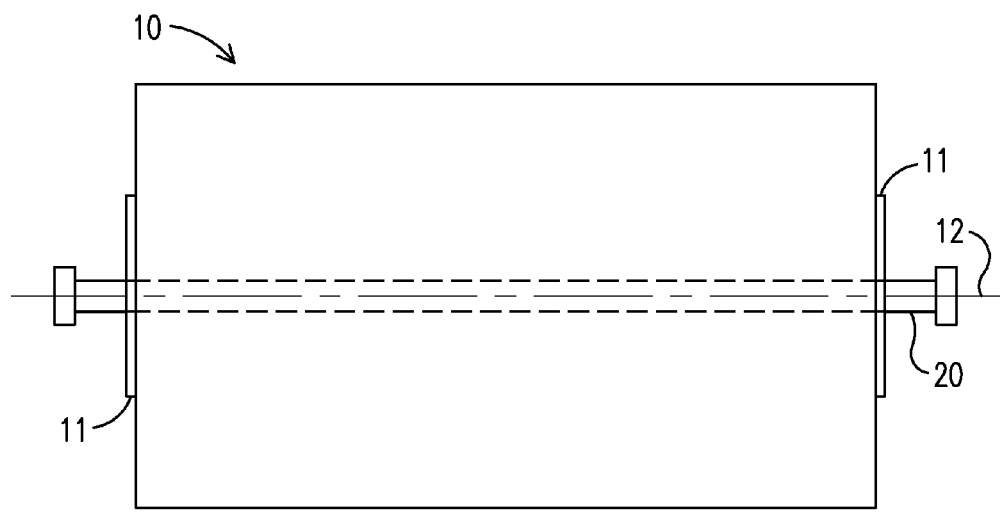
FIG. 1 is a simplified view of a known electric generator that employs the present invention.

An overview of the invention is provided below followed by a more detailed explanation. Referring to FIG. 1, a hydrogen cooled electric generator 10 typically comprises a rotor 20 arranged along a centerline 12 of the generator 10. At the ends of the generator 10 are bearing brackets 11 that include bearings that rotatably support the rotor 20.

Components

Referring to FIG. 2, attached to the bearing bracket 11 is the gland seal bracket 31. The gland seal bracket is removably affixed to the bearing bracket 11 where the gland seal bracket 31 is shown bolted to the bearing bracket 11, however, one skilled in the art will readily appreciate that the gland seal bracket 31 can be fixed to the bearing bracket 11 in any manner suitable to removably affix the gland seal bracket 31 to the bearing bracket 11. The gland seal bracket 31 has a recess 32 arranged circumferentially around the rotor 20. Arranged along an axial face of the recess that is operatively exposed to the hydrogen gas of the generator interior 39 is a further circumferential recess or groove 33. The axial face of the recess opposite the further recess 33 is the air side axial face 38 (see FIGS. 8 through 10).

Referring again to FIG. 2, the recess 32 is configured to receive and support a gland seal 30. The gland seal 30 is a well known structure forming a ring surrounding the rotor 20. The gland seal 30 may be formed of several segments joined together or may be a unitary ring. However, the particular formation of the gland seal 30 is not determinative to the scope of the present invention and one skilled in the art will readily appreciate that there are many configurations of a gland seal 30 that are operative within the scope of the present invention.

Figure 3:
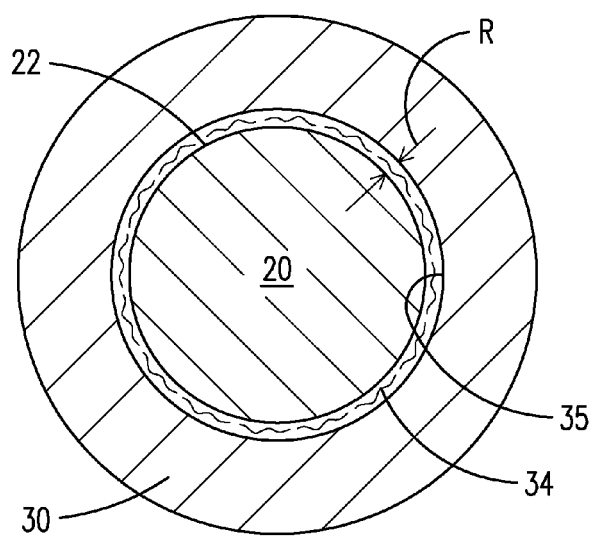
FIG. 3 is a cross-sectional view of the gland seal and rotor of FIG. 2.

Referring to FIG. 3, the gland seal inner diameter 35 is slightly greater than the rotor outer diameter 22 to form a radial gap R. The gland seal has internal passages (not shown) running from outer diameter openings onto the inner diameter of the gland seal 35 that operatively provide pressurized oil that fills the radial gap R such that the gland seal 30 rides upon an oil film 34 between the rotor and the gland seal inner diameter and effectively seals-off the radial gap R against the escape of the generator internal hydrogen gas. The gland seal 30 is rotationally restrained from rotating along with the rotor by anti-rotation pins (not shown) that engage the gland seal 30 and the gland seal bracket 31.

Referring again to FIG. 2, the rotor has a radial shoulder 21 arranged at an axial distance from the gland seal 30. The radial shoulder 21 is formed such that the shoulder is essentially perpendicular to the instantiations centerline of the rotor 13 (see FIG. 5).

Figure 4:
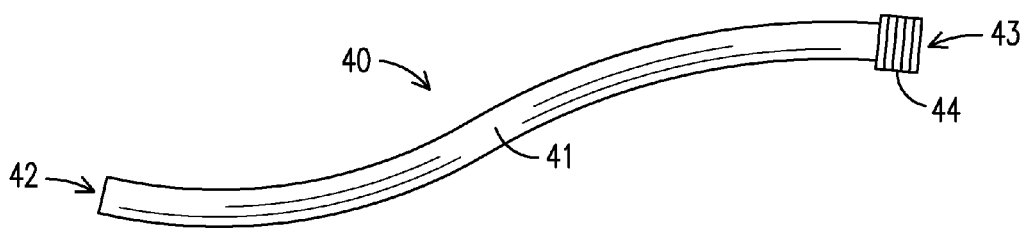
FIG. 4 is a view of a pressure bellows.

Referring to FIG. 4, a pressure bellows 40 is a flexible tube like structure having a middle hose portion 41, a pressure tight closed end 42 and a selectively sealable and preferably pressure tight connecter 44 arranged at an open end 43 opposite the closed end 42. The pressure bellows 40 is sized and configured such that it can be easily inserted into the further recess 33 and having an inflated diameter sufficient to expand within the further recess 33 and engage the gland seal 30 and secure the gland seal 30 against the recess air side axial face 38 (see FIGS. 8 and 9). The pressure bellows 40 is inventively employed to assist with the proper alignment of the gland seal 30 such that the gland seal 30 effectively seals the rotor 20 against the leakage of hydrogen gas.

Operation

To effectively seal the radial gap R between the gland seal 30 and the rotor 20, the oil film 34 must exert a force greater than that exerted by the internal hydrogen gas, otherwise the hydrogen gas would blow out the oil film 34 and escape through the radial gap R (see FIG. 3). In order to ensure a consistent radial gap R and therefore a properly sealing oil film 34, the gland seal inner diameter surface 35 must be parallel to the rotor outer diameter surface 22. Direct measurement or verification of the parallelism of the gland seal inner diameter surface 35 and the rotor outer diameter surface 22 is not practical. However, by ensuring that an easily measurable axial face of the gland seal such as the gland seal hydrogen side axial face 36 is manufactured essentially perpendicular to the gland seal inner diameter surface 35, and a radial shoulder 21 of the rotor is manufactured essentially perpendicular to the instantaneous rotor centerline 13 an axial distance can be easily measured to determine that the gland seal hydrogen side axial face 36 and the radial shoulder 21 are parallel and therefore inferring that the gland seal inner diameter surface 35 is parallel to the rotor outer diameter surface 22 (see FIGS. 2, 5 and 8-10).

Figure 8:
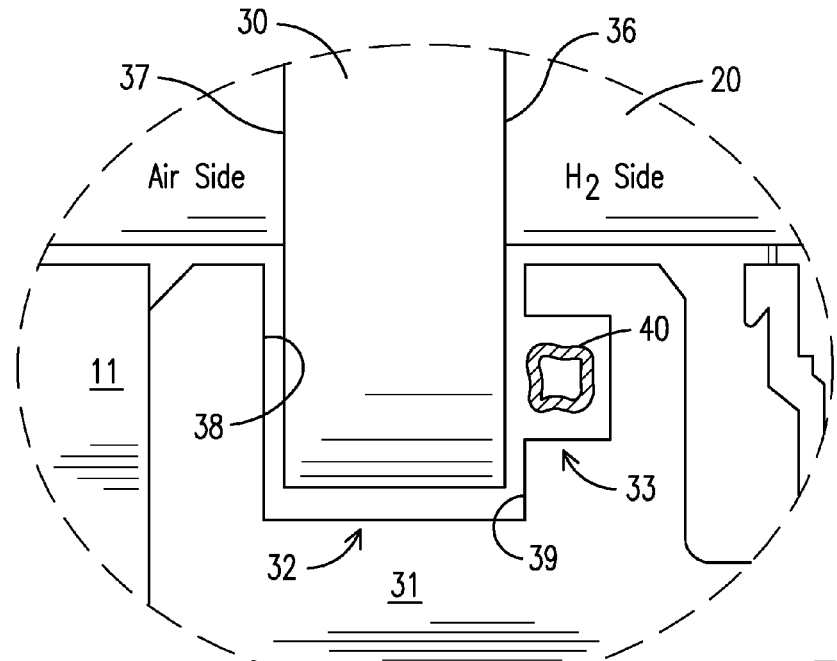
FIG. 8 is a close up view of FIG. 7.
Figure 9:
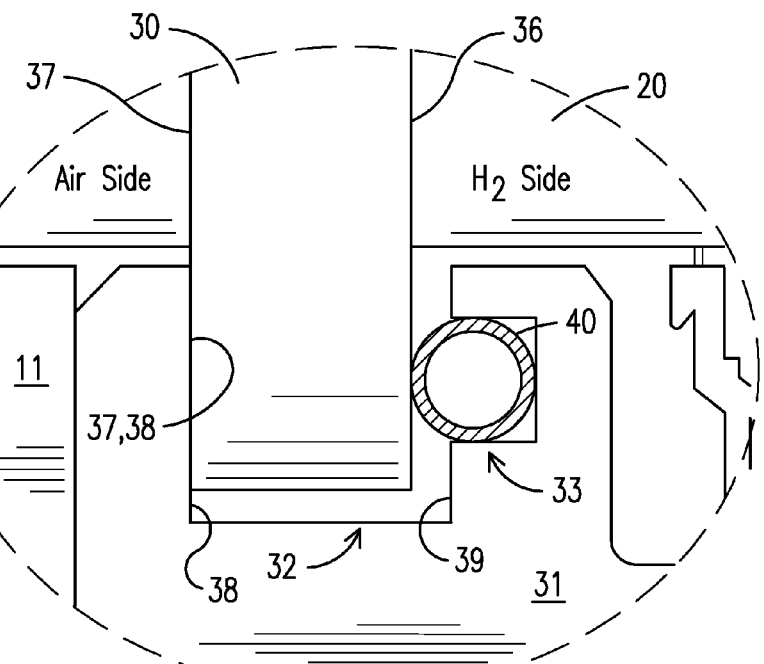
FIG. 9 shows the system of FIG. 8 with the pressure bellows inflated.

In order to achieve accurate results when measuring the axial distance between the gland seal hydrogen side axial face 36 and the radial shoulder 21, the gland seal 30 should be restrained such that the gland seal air side axial face 37 is firmly secured against the recess air side axial face 38 (see FIGS. 8 and 9).

Figure 6:
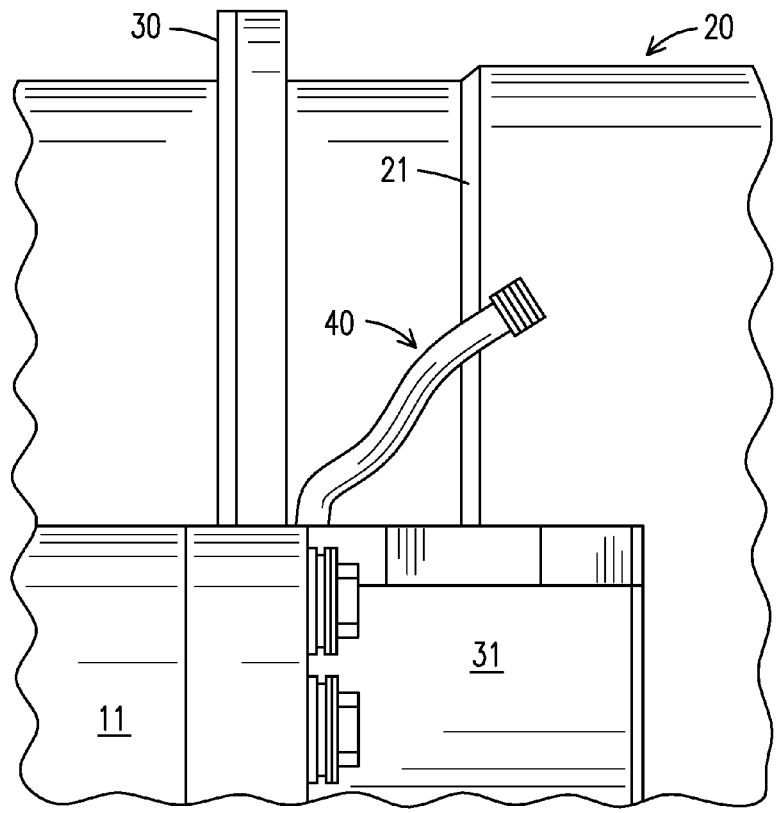
FIG. 6 is a side view of FIG. 2 with a deflated pressure bellows installed.
Figure 7:
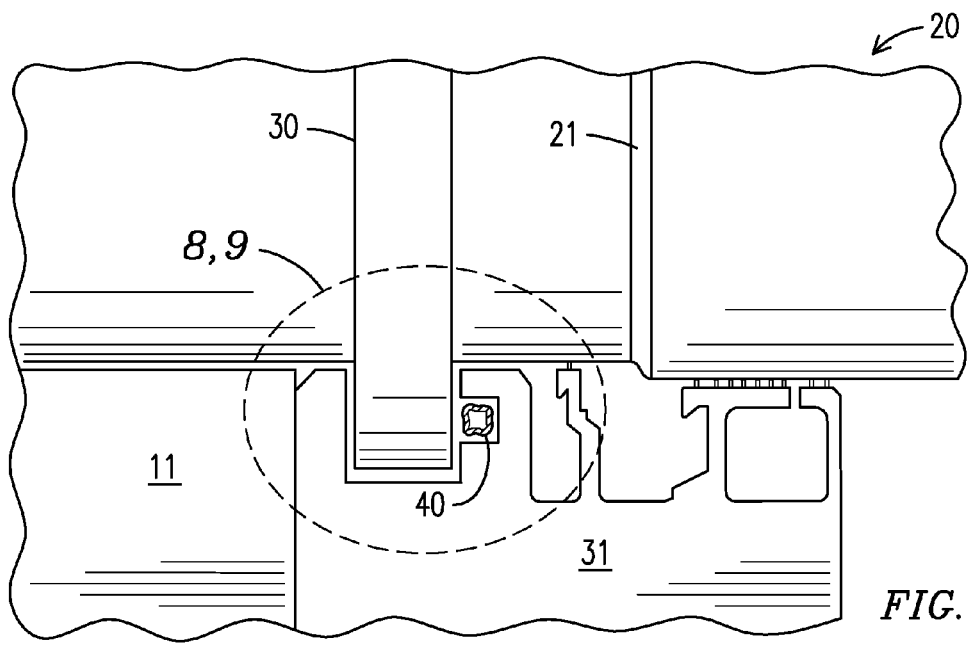
FIG. 7 is a top view of FIG. 6.

The present invention makes use of an inventive tube like pressure bellows 40 to reliably secure the gland seal 30 against the recess air side axial face 38 (FIG. 9). The deflated pressure bellows 40 is guided into the oil well 33 provided in the gland seal bracket 31, at least partially along a length of the circumferential further recess 33, as seen in FIGS. 6 through 8. Preferably, a length of pressure bellows 40 is inserted to span at least a 45° arc, more preferably a 90° arc and most preferably a 180° arc or an entirety of the further recess 33, however at a minimum, a length of pressure bellows 40 is required such that once inflated, sufficient force is exerted onto the gland seal 30 by the pressure bellows 40 to seat and secure the gland seal 30 against the recess air side axial face 38. Once the pressure bellows 40 is in place, the pressure bellows connector 44 is attached to a pressurizing device (not shown), for example but not limited to a pump or compressor, to form a selectively sealable and preferably leak tight connection. Once the pressure bellows 40 is pressurized, the pressure bellows 40 expands within the further recess 33 and engages the gland seal 30. The internal pressure of the pressure bellows 40 exerts a contact force in the axial direction against the gland seal 30 which urges the gland seal 30 against the recess air side axial face 38, see FIG. 9.

Feeler gauges can be inserted in the resultant gap between the recess hydrogen side face 39 and the gland seal hydrogen side axial face 36 to verify that the gland seal 30 is properly seated against the recess air side axial face 38.

Figure 10:
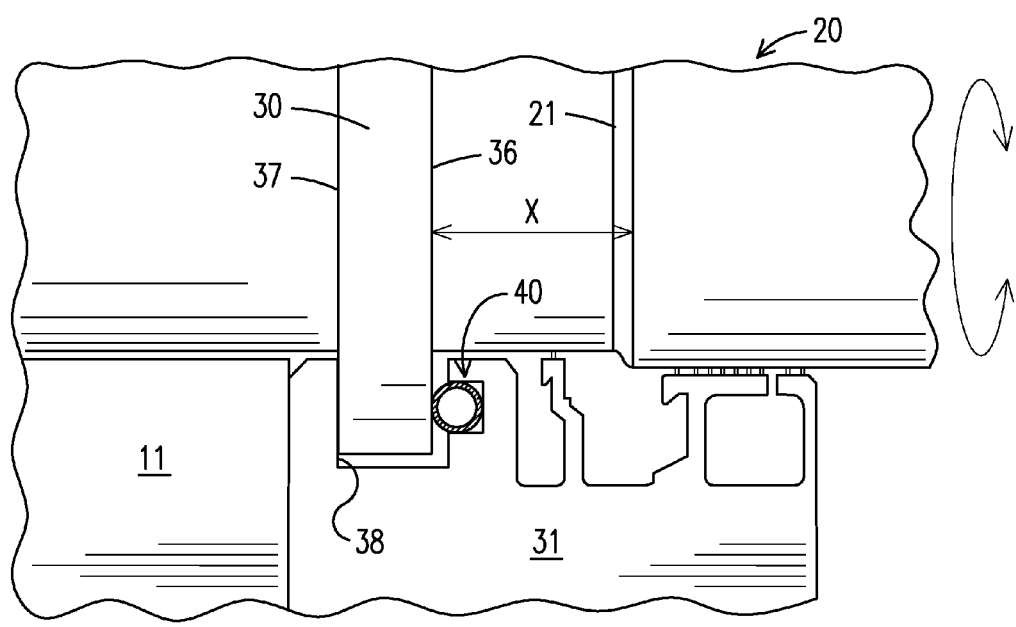
FIG. 10 shows the axial measurement of the gland seal.

With the pressure bellows 40 inflated and the gland seal 30 secured and seated against the recess air side axial face 38, the axial distance X between the gland seal hydrogen side axial face 36 and the radial shoulder 21 as shown in FIG. 10. By repeating the measurement of the axial distance X, at least three times, a plane defining the surface of the gland seal hydrogen side axial face 36 can be determined relative to the rotor radial shoulder 21. Because the radial shoulder 21 is manufactured essentially perpendicular to the rotor instantaneous centerline 13, and the gland seal hydrogen side axial face 36 is manufactured essentially perpendicular to the gland seal inner diameter surface 35 then the parallelism of the gland seal inner diameter surface 35 and the rotor instantaneous centerline 13 can be inferred. Furthermore, the parallelism of the gland seal inner diameter surface 35 and the rotor instantaneous centerline 13 can be compared with a predetermined acceptable parallelism value. If the parallelism of the gland seal inner diameter surface 35 and the rotor instantaneous centerline 13 is determined to be unacceptable, an alignment of the gland seal 30 can be adjusted by adjusting the orientation of the gland seal bracket 31. For example, the mating surface of the gland seal bracket 31 can be machined appropriately to achieve the desired orientation of the gland seal 30. Specifically, when the gland seal 30 is firmly secured against the recess air side axial face 38 by the inflated pressure bellows 40 the recess air side axial face 38 serves as a control surface that effectively determines the parallelism of the gland seal inner diameter surface 35 and the rotor instantaneous centerline 13. Therefore, by adjusting the orientation of the gland seal bracket 31 relative to the rotor 20 the orientation of the gland seal 30 and ultimately the parallelism of the gland seal inner diameter surface 35 to the rotor instantaneous centerline 13 can be adjusted.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of determining an alignment between a gland seal and a rotor of a turbomachine, comprising:
    arranging a gland seal essentially concentric with the rotor and into a gland seal bracket, wherein the gland seal bracket comprises:
        a radial recess sized and configured to accept a portion of the gland seal, the radial recess having a first radial wall and a second radial wall arranged opposite the first radial wall, and
        a circumferential groove arranged along the first radial wall of the radial recess such that the groove has an open side facing the gland seal;
    inserting a deformable device into a length of the circumferential groove provided in the gland seal bracket;
    expanding the deformable device such that the gland seal ring is urged axially against an axial face of the gland seal bracket;
    ensuring that the gland seal is seated against the second radial wall of the gland seal bracket radial recess measuring an axial distance at a plurality of locations between a shoulder of the rotor and an axial surface of the gland seal ring; and
    determining an alignment of the gland seal ring and the rotor based on the plurality of measured axial distances.

2. The method of claim 1, further comprising determining a parallelism between a sealing surface of the gland seal and the journal portion of the rotor.

3. The method of claim 1, wherein the inflatable member circumscribes and arc length of at least 45°.

4. The method of claim 1, wherein the inflatable member circumscribes and arc length of at least 90°.

5. The method of claim 1, wherein the inflatable member circumscribes and arc length of approximately 180°.

6. The method of claim 1, wherein feeler gauges are inserted into a resultant gap between the first radial wall of the gland seal bracket radial recess and the gland seal to ensure that the gland seal is seated against the second radial wall of the gland seal bracket radial recess.

7. The method of claim 1, wherein the expandable device is a flexible balloon like pressure bellows having a closed end and an open end.

8. The method of claim 7, wherein the open end of the expandable device includes a selectively sealable connector configured to accept a pressurized medium.

9. The method of claim 8, wherein the pressurized medium is pressurized via a pump having a connector configured to mate with the pressure bellows connector to form a selectively sealable connection.

10. A system for measuring radial alignment between a gland seal ring and a journal of a rotor of a turbo machine, comprising:
    an expandable balloon like pressure bellows having:
        a closed end and an open end arranged opposite the closed end, and
        a selectively sealable connector configured to receive a pressurized medium arranged at the open end, wherein the pressure bellows is configured to be inserted into a circumferential groove provided in a gland seal bracket that supports the gland seal ring such that the groove has an open side facing the gland seal ring;
    a pump configured to deliver a pressurized medium to the pressure bellows, the pump having a connector configured to mate with the connector of the pressure bellows forming a selectively sealable connection, wherein the gland seal partial ring is urged axially against an axial face of the gland seal bracket upon actuation of the pump;
    an internal micrometer configured to measure an internal distance between a radial shoulder of the rotor and an axial face of the gland seal ring; and
    a determining device configured to receive measurement values of the internal micrometer and determines an alignment of the gland seal ring and a journal of the rotor.

11. The system of claim 10, wherein the determining device determines a parallelism between a sealing surface of the gland seal and the journal portion of the rotor.

12. The system of claim 10, wherein the pressure bellows is further configured for insertion into an entirety of the circumferential groove.

13. The system of claim 10, further comprising feeler gauges configured for insertion into a resultant gap between a radial recess of the gland seal bracket that support the gland seal ring and the axial face of the gland seal ring to ensure that the gland seal ring is seated against the axial face of the gland seal bracket.

14. A method of determining an alignment between a floating seal and a rotor of a turbomachine, comprising:
    establishing a reference surface on the rotor of the turbomachine, where the reference surface is essentially perpendicular to an instantaneous centerline of the rotor;
    providing a floating seal member arranged circumferentially surrounding the rotor such that the seal floats on an oil film between facing surfaces of the seal member and the rotor;
    establishing a control surface that radially aligns the seal member to the rotor;

providing an inflatable member arranged between a stationary portion of the turbomachine and a surface of the floating seal;

inflating the inflatable member such that the inflatable member urges the floating seal firmly against the control surface;

measuring an axial distance between a surface of the floating seal and the reference surface on the rotor at a plurality of locations;

determining a parallelism between the facing surfaces of the floating seal and the rotor based upon the plurality of measured axial distances;

comparing the determined parallelism of the floating seal and the rotor with a predetermined threshold; and adjusting an orientation of the control surface based upon the comparison of the parallelism of the floating seal and the rotor with the predetermined threshold.

15. The method of claim 14, wherein the inflatable member circumscribes and arc length of at least 45°.

16. The method of claim 14, wherein the inflatable member circumscribes and arc length of at least 90°.

17. The method of claim 14, wherein the inflatable member circumscribes and arc length of approximately 180°.

\* \* \* \* \*